United States Patent [19]
Nakata

[11] Patent Number: 4,977,466
[45] Date of Patent: Dec. 11, 1990

[54] MAGNETIC TAPE WIND-UP CONTROL METHOD, AND TAPE WIND-UP APPARATUS

[75] Inventor: Tomohiro Nakata, Kanagawa, Japan

[73] Assignee: Fuji Photo Film Co., Ltd., Kanagawa, Japan

[21] Appl. No.: 374,802

[22] Filed: Jul. 3, 1989

[30] Foreign Application Priority Data

Jul. 4, 1988 [JP] Japan .................................. 63-166383
Sep. 30, 1988 [JP] Japan .................................. 63-247221

[51] Int. Cl.$^5$ ............................................. G11B 15/46
[52] U.S. Cl. .................................. 360/73.08; 242/186
[58] Field of Search ................. 360/73.8, 96.3, 73.4; 242/186, 191, 203

[56] References Cited

U.S. PATENT DOCUMENTS 4,561,608 12/1985 O'Gwynn ........................... 242/186
4,786,992 11/1988 Tajima ........................... 360/73.08 X Primary Examiner—A. J. Heinz
Attorney, Agent, or Firm—Sughrue, Mion, Zinn, Macpeak & Seas

[57] ABSTRACT

A magnetic tape wind-up control method comprises the steps of controlling the speed, at which a feed motor is rotated, in accordance with a signal generated by a tape movement detector, and controlling the speed, at which a wind-up motor is rotated, in accordance with a signal which represents the position of a dancing arm, which thereby controls the tension on the magnetic tape. The number of revolutions completed by the wind-up motor is detected, and the outer diameter of a roll of magnetic tape, which is being wound around a wind-up reel, is calculated from the thickness of the magnetic tape, the diameter of a core of the wind-up reel, and the number of revolutions completed by the wind-up motor. The value indicated by a tape speed command is divided by the outer diameter of the roll of the magnetic tape. A rotation speed command signal, which represents the quotient of this division, is generated, and the speed of rotation of the wind-up motor is controlled on the basis of the rotation speed command signal. Simultaneously, the tension on the magnetic tape is controlled on the basis of the position of the dancing arm.

11 Claims, 8 Drawing Sheets

MAGNETIC TAPE WIND-UP CONTROL METHOD, AND TAPE WIND-UP APPARATUS

BACKGROUND OF THE INVENTION

1. Field of the Invention

This invention relates to a magnetic tape wind-up control method for controlling the tension on a magnetic tape when the magnetic tape is fed from a feed reel and wound around a wind-up reel. This invention particularly relates to a magnetic tape wind-up control method wherein the speed at which the feed reel is rotated is controlled, and the tension on the magnetic tape is controlled on the side of the wind-up reel so that the magnetic tape is wound up accurately with little fluctuation in the tension on the magnetic tape. This invention also relates to a tape wind-up control method wherein the speed at which a tape is moved from a feed reel to a wind-up reel is controlled in accordance with a predetermined reference speed pattern.

The present invention further relates to a tape wind-up apparatus for controlling a long tape delivered from a feed reel so that the tape travels at a constant speed, and more particularly to a tape wind-up apparatus for winding up a predetermined length of a long original tape wound about a feed reel on a series of wind-up reels.

2. Description of the Prior Art

When magnetic tapes are fed from feed reels and wound around wind-up reels in accordance with a predetermined speed pattern, the tension on the magnetic tapes which are being wound around the wind-up reels should be controlled in accordance with a predetermined pattern. For this purpose, conventional apparatuses for winding up a magnetic tape are constituted as shown in FIG. 11. With reference to FIG. 11, a magnetic tape 2 fed from a feed reel 1 is threaded over a counting roller 3 and a dancing roller 4, and is wound around a wind-up reel 5. The counting roller 3 is positioned so that it is in contact with the magnetic tape 2, and is rotated as the magnetic tape 2 is moved, thereby allowing the length over which the magnetic tape 2 has been fed, and the feed speed at which the magnetic tape 2 is fed to be detected. The dancing roller 4 is rotatably supported on a dancer arm (not shown) and is urged by an arm spring (not shown) in such a way that it pulls out the magnetic tape 2 which is guided by a pair of guide rollers 6 and 7. The feed reel 1 and the wind-up reel 5 are rotated respectively by a feed motor 8 and a wind-up motor 9.

On the other hand, a reference speed value Vref and a reference tension value Tref are respectively stored in ROM's 10 and 11. A signal which represents the reference speed value Vref is fed into a differential amplifier 14 via a D/A converter 12. A signal which represents the reference tension value Tref is fed into a differential amplifier 15 via a D/A converter 13. Also, a signal representing the feed speed of the magnetic tape 2 which feed speed is detected by the counting roller 3 is fed into the differential amplifier 14, and a signal representing the tension on the magnetic tape 2 which tension is detected from the position of the dancing roller 4 is fed into the differential amplifier 15. The differential amplifier 14 calculates the difference between the reference speed value Vref and the detected feed speed of the magnetic tape 2. The differential amplifier 15 calculates the difference between the reference tension value Tref and the detected tension on the magnetic tape 2. The differences are fed into servo amplifiers 16 and 17 in order to control the speeds at which a feed motor 8 and a wind-up motor 9 are rotated, so that the feed speed and the tension on the magnetic tape 2 become equal to the reference values.

One of such means for controlling the tension on the magnetic tape is disclosed in Japanese Unexamined Patent Publication No. 57(1982)-78664. The disclosed means predicts the length of the magnetic tape which length is required in a vacuum column, and feeds the predicted length of magnetic tape into the column during quick tape movement operations.

However, the conventional magnetic tape wind-up control method has the problems described below. FIGS. 12A through 12E are graphs showing characteristics of a conventional apparatus for winding up a magnetic tape. The speed command voltage V fed to the feed motor 8 changes as shown in FIG. 12A from the point at which the motor begins to rotate to the point at which it stops rotating. At this time, a graph of the current I flowing into the feed motor 8 should appear as shown in FIG. 12B. However, actually, because a braking force which is proportional to the speed of rotation of the motor 8 is applied as shown in FIG. 12C, the graph of the current I flowing into the feed motor 8 actually appears as shown in FIG. 12D. Therefore, as indicated by the solid line in FIG. 12E, the tension on the side of the wind-up reel 5, which is detected from the position of the dancing roller 4, deviates from the reference tension value Tref indicated by the broken line. Specifically, when the voltage fed to the feed motor 8 is increasing in value (the acceleration zone in FIG. 12A), the position of the dancing roller 4 is lower than the reference position, and the dancing roller 4 is gradually moved down. Thereafter, at the end of the acceleration zone, the dancing roller 4 is moved up in such a way that a discontinuity is created in the graph of the tension. In the constant speed zone, the dancing roller 4 is kept at a position slightly lower than the reference position. Thereafter, in the deceleration zone, the dancing roller 4 is gradually moved up to a position higher than the reference position. Accordingly, with the conventional magnetic tape wind-up control method, the tension on the magnetic tape 2 cannot be controlled accurately and made equal to the reference tension value Tref.

The technique disclosed in Japanese Unexamined Patent Publication No. 57(1982)-78664 is designed to control the tension on the magnetic tape with a vacuum column, and is different from the technique of the present invention.

SUMMARY OF THE INVENTION

The primary object of the present invention is to provide a magnetic tape wind-up control method wherein the tension on a magnetic tape which is being wound up is controlled accurately.

Another object of the present invention is to provide a tape wind-up control method wherein damage to a tape is minimized when the winding-up of the tape in accordance with a predetermined reference speed pattern is finished, and wherein the time required to wind up the tape is shortened.

The present invention has been conceived in order. A further object of the present invention to provide a tape wind-up apparatus in which even if the load on a motor for driving a feed reel varies as the diameter of the tape wound up on a feed reel varies, the actual tape speed can closely follow a predetermined tape speed pattern.

The present invention provides a magnetic tape wind-up control method for use when a magnetic tape is wound around a wind-up reel in a magnetic tape apparatus, said apparatus comprising:

(i) a feed reel which is rotated by a feed motor, (ii) the wind-up reel which is rotated by a wind-up motor, (iii) a movement detector which is located in the path along which the magnetic tape moves from the feed reel to the wind-up reel and which detects the feed speed of the magnetic tape and the length over which the magnetic tape has been fed, (iv) a dancing roller which is located between the movement detector and the wind-up reel in order to provide tension on the magnetic tape, (v) a position detector which detects the position of the dancing arm, (vi) a means for generating a tape speed command, and (vii) a means for generating a tape tension command, the speed at which the feed motor is rotated being controlled in accordance with a signal generated by the movement detector, and the speed at which the wind-up motor is rotated being controlled in accordance with a signal generated by the position detector, thereby to control the tension on the magnetic tape, wherein the improvement comprises the steps of:

(a) detecting the number of revolutions of said wind-up motor, (b) calculating the outer diameter of a roll of said magnetic tape, which is being wound around said wind-up reel, from the thickness of said magnetic tape and the diameter of a core of said wind-up reel, which values have been stored in advance, and from the number of revolutions completed by said wind-up motor, (c) dividing the value of said tape speed command by the outer diameter of the roll of said magnetic tape, (d) generating a rotation speed command signal which represents the quotient of said division, and controlling the speed of rotation of said wind-up motor on the basis of the rotation speed command signal, and (e) simultaneously controlling the tension on said magnetic tape on the basis of the position of said dancing arm.

In the magnetic tape wind-up control method in accordance with the present invention, the feed speed of the magnetic tape on the side of the feed reel is divided by the outer diameter of the roll of the magnetic tape which is being wound around the wind-up reel. The quotient, i.e. the number of revolutions of the wind-up reel, is added to the factors which affect the control of the tension. Specifically, the tension on the magnetic tape on the side of the wind-up reel and the feed speed of the magnetic tape on the side of the feed reel are utilized to control the wind-up motor. Therefore, the tension on the magnetic tape can be controlled accurately.

The present invention also provides a tape wind-up control method in which, when a predetermined length of a tape fed from a feed reel is wound around a wind-up reel, the speed at which the tape is moved is controlled on the basis of a predetermined reference speed pattern comprising an acceleration zone, which is of a predetermined duration and which starts when the winding-up of the magnetic tape is begun, and a deceleration zone which is of a predetermined duration and which terminates when the winding-up of the magnetic tape is finished, wherein the improvement comprises the steps of:

(i) selecting at least one check point in the deceleration zone of said reference speed pattern, (ii) detecting the length, over which said tape has been moved after the winding-up of said tape was begun, at said check point, (iii) comparing the detected length with a reference tape movement length which is based on said reference speed pattern, and (iv) controlling the speed, at which said tape is moved, on the basis of the results of said comparison so that said predetermined length of tape has been wound around said wind-up reel at the end of said reference speed pattern.

With the tape wind-up control method in accordance with the present invention, the difference between the reference tape movement length and the length, over which the tape has been moved after the winding-up of the tape was begun, is calculated at the selected check point in the deceleration zone of the reference speed pattern. The speed at which the tape is moved is controlled on the basis of the difference so that the predetermined length of tape is wound around the wind-up reel at the time the speed in the reference speed pattern becomes zero. Specifically, when the length over which the tape has been moved is shorter than the reference tape movement length at the check point, the speed at which the tape is moved is increased to a value above that indicated by the reference speed pattern. When the length over which the tape has been moved is longer than the reference tape movement length at the check point, the speed at which the tape is moved is decreased to a value below that indicated by the reference speed pattern. In cases where the speed at which the tape is moved is controlled in this manner in the deceleration zone corresponding to the end part of the reference speed pattern, even though the slope of the reference speed pattern in the deceleration zone may remain constant or may change continuously, it is possible to eliminate problems resulting from the speed at which the tape is moved still being high at the time the predetermined length of tape has been wound up around the wind-up reel. Therefore, unlike the situation with conventional techniques, a constant speed zone in which the tape is moved at a very low speed need not be provided at the end of the deceleration zone of the reference speed pattern in order to minimize damage to the tape, which damage arises when the feed motor is quickly stopped after the predetermined length of tape has been wound up. As a result, the time required to wind up the tape can be shortened without any increase in the amount of damage done to the tape at the end of tape wind-up operation.

The tape wind-up apparatus according to the present invention is characterized in that the speed of tape movement between a feed reel and a wind-up reel is detected by a speed detecting means, a speed signal representing the detected speed is compared with a predetermined pattern reference signal by a comparison means, a feed reel driving means is controlled by a control means so that the movement speed of said tape may follow a predetermined speed pattern, the diameter of the tape wound up on the feed reel is detected by a tape-diameter detecting means, and a gain controlling the output of said control means to said driving means for the feed reel is corrected by a gain correcting means on the basis of said detected result.

According to the above-described arrangement, the tape movement speed is detected and tape-diameter information regarding the diameter of the tape wound up on the feed reel is input into a control loop which forces the tape movement speed to follow a speed corresponding to a predetermined tape speed pattern on the basis of the detected result. A gain controlling the output of said control means to said driving means for the feed reel is corrected on the basis of the tape diameter information. Therefore, even when the diameter of the tape wound up on the feed reel and the load on the driving motor for the feed reel are large, the gain is corrected according to the information about the tape diameter, and the actual tape movement speed closely follows the predetermined tape speed pattern.

DESCRIPTION OF THE PREFERRED EMBODIMENTS

The present invention will hereinbelow be described in further detail with reference to the accompanying drawings.

Figure 1:
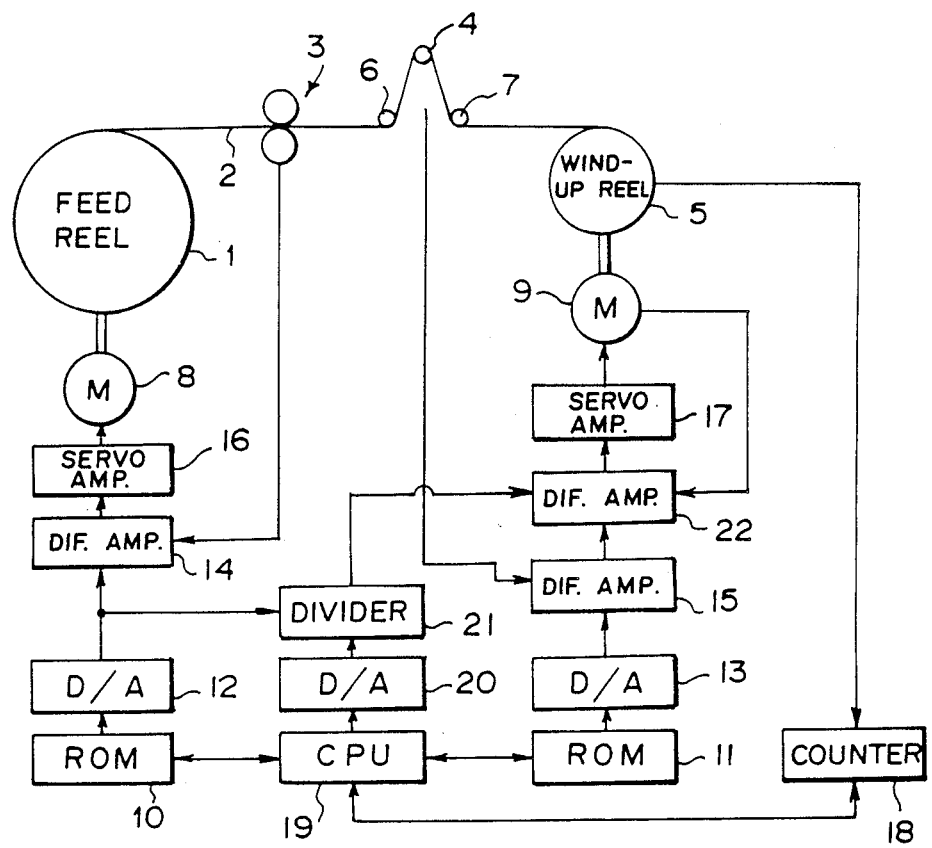
FIG. 1 is a block diagram showing a magnetic tape wind-up apparatus wherein an embodiment of the magnetic tape wind-up control method in accordance with the present invention is employed.
Figure 11:
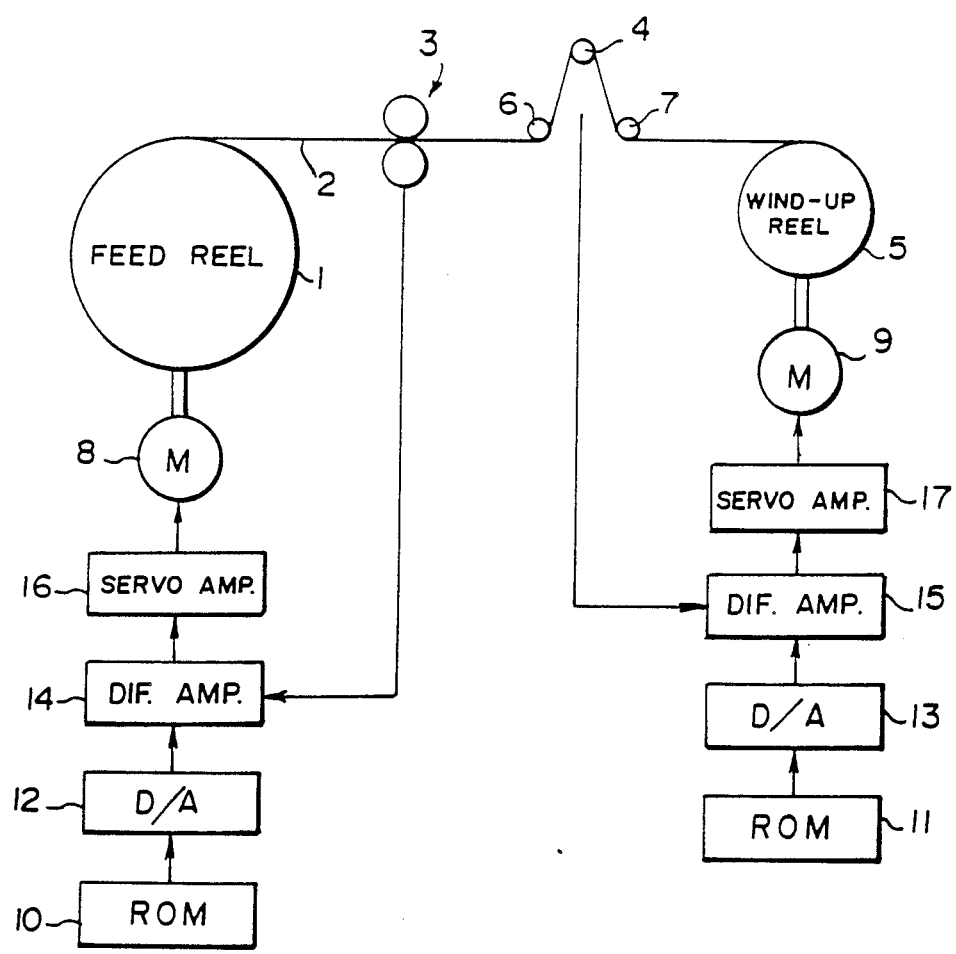
FIG. 11 is a block diagram showing a conventional magnetic tape wind-up apparatus.

In FIG. 1, similar elements are numbered with the same reference numerals with respect to FIG. 11. With reference to FIG. 1, a magnetic tape wind-up apparatus is provided with a counter 18 which detects the number of revolutions of the wind-up reel 5, and a CPU 19 which is connected to the counter 18 and the ROM's 10 and 11. A divider 21 is connected to the CPU 19 via a D/A converter 20 and is connected to the output side of the D/A converter 12. Also, a differential amplifier 22 is connected to the divider 21 and is located between the differential amplifier 15 and the servo amplifier 17.

How the wind-up of the magnetic tape 2 is controlled in this embodiment will be described hereinbelow. The signals which represent the thickness of the magnetic tape 2 and the diameter of the core of the wind-up reel 5, which are stored in the ROM 11, are fed into the CPU 19. The CPU 19 calculates the diameter Rt of the roll of the magnetic tape 2, which is being wound around the wind-up reel 5, from the number of revolutions completed by the wind-up reel 5, which number is received from the counter 18. A signal representing the diameter Rt is fed into the divider 21 via the D/A converter 20. Simultaneously, a reference speed value Vref is fed from the ROM 10 into the divider 21 via the D/A converter 12. The divider 21 divides Vref by Rt. The signal representing the quotient of Vref/Rt represents the reference number of revolutions of the wind-up reel 5 and is fed into the differential amplifier 22. The differential amplifier 22 carries out differential amplification using the signal, which represents the quotient Vref/Rt, and a speed feed back signal Tg which is received from the wind-up motor 9. The differential amplifier 22 feeds the signal which represents the results of the differential amplification, and the tension servo signal, which is received from the ROM 11 via the D/A converter 13, into the servo amplifier 17 in order to control the speed at which the wind-up motor 9 is rotated.

Figure 2:
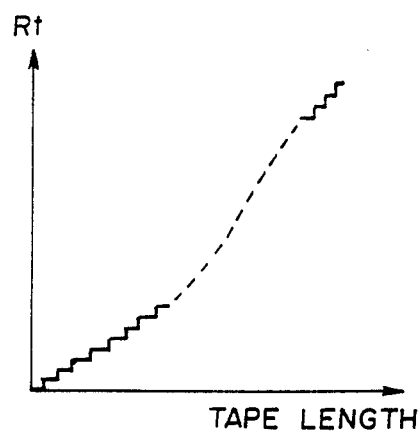
FIG. 2 is a graph showing the change in the calculated outer diameter of a roll of the magnetic tape which is being wound around a wind-up shaft.

How the diameter Rt of the roll of the magnetic tape 2 which is being wound around the wind-up reel 5 is calculated will be described hereinbelow. In general, the diameter Rt is expressed as $\Sigma\{(\text{number of revolutions}) \times (\text{thickness of tape})\}$. In cases where a CPU carries out the calculation of this formula, it takes a long time for the multiplication to be performed unless a special operation processor is used. Therefore, in this embodiment, the length and the thickness of the magnetic tape 2 are stored in advance, and the value of the diameter Rt is increased by one bit for each predetermined number of revolutions. An encoder is mounted on the wind-up reel 5, and the pulse signal generated by the encoder is fetched by a CTC. The pulse signal is interrupted every predetermined number of revolutions, and the value of the diameter Rt is output as shown in FIG. 2.

Figure 3:
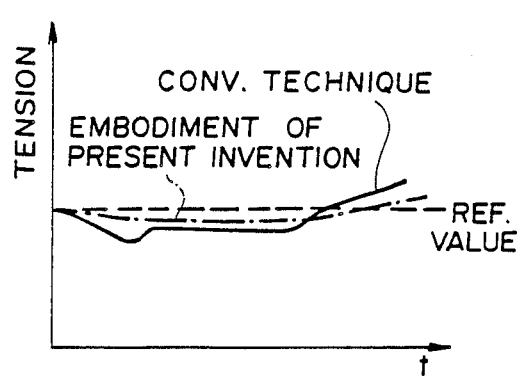
FIG. 3 is a graph showing the fluctuation in the tension on the tape in the embodiment of FIG. 1.
Figure 12A:
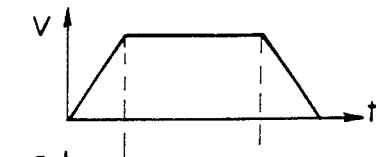
FIGS. 12A through 12E are graphs of various characteristics of a conventional magnetic tape wind-up apparatus.
Figure 12B:
Figure 12C:
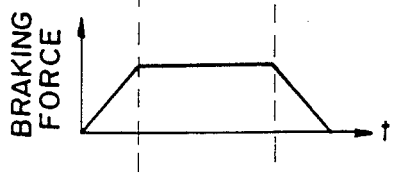
Figure 12D:
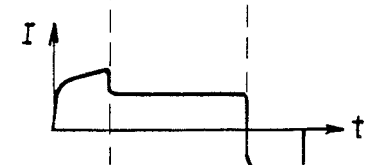
Figure 12E:

With the aforesaid embodiment, the speed of the feed motor 8 is utilized as the factor defining the number of revolutions which the wind-up motor 9 should have completed. Therefore, the tension on the magnetic tape 2 can be controlled more accurately than with the conventional technique wherein the tension on the magnetic tape 2 is detected on the side of the wind-up reel 5 from the position of the dancing roller 4 and wherein the speed of the wind-up motor 9 is fed back and controlled in order to allow the tension on the magnetic tape 2 to be controlled according to a predetermined pattern. Specifically, with the aforesaid embodiment, as indicated by the chained line in FIG. 3, the tension on the magnetic tape 2 could be controlled so that it was approximately equal to the reference value indicated by the broken line in FIG. 3.

An embodiment of the tape wind-up control method in accordance with the present invention will be described hereinbelow with reference to FIGS. 4 through 7.

Figure 4:
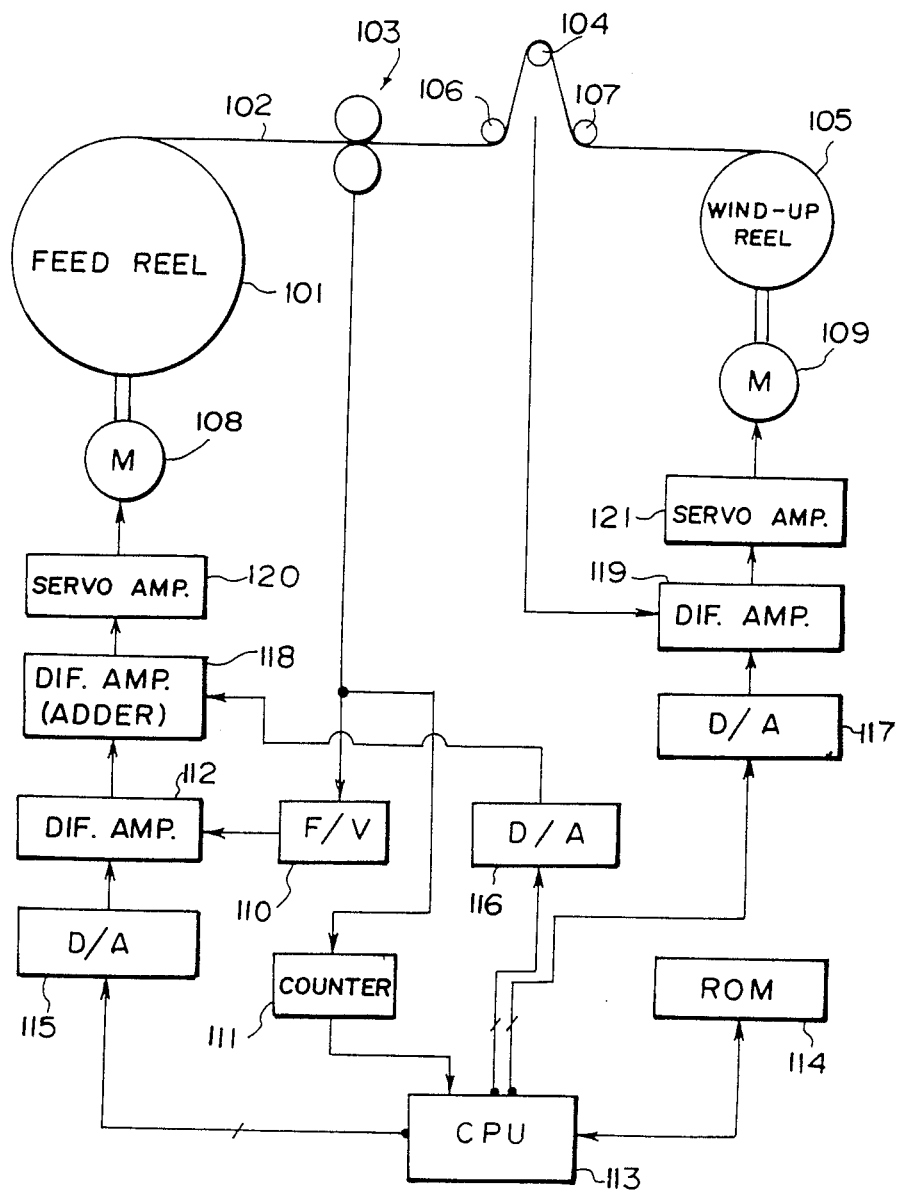
FIG. 4 is a block diagram showing a magnetic tape wind-up apparatus wherein an embodiment of the tape wind-up control method in accordance with the present invention is employed.

With reference to FIG. 4, a magnetic tape 102 fed from a feed reel 101 is threaded over a counting roller 103 and a dancing roller 104, and is wound around a wind-up reel 105. The counting roller 103 is positioned such that it is in contact with the magnetic tape 102, and is rotated as the magnetic tape 102 is moved, thereby allowing the length over which the magnetic tape 102 has been fed, and the speed at which the magnetic tape 102 is fed to be detected. The dancing roller 104 is rotatably supported on a dancer arm (not shown) and is urged by an arm spring (not shown) in such a way that it pulls out the magnetic tape 102 which is guided by a pair of guide rollers 106 and 107. The feed reel 101 and the wind-up reel 105 are rotated respectively by a feed motor 108 and a wind-up motor 109. A rotation signal generated by the counting roller 103 is fed into an F/V converter 110 and a counter 111. The F/V converter 110 converts the frequency of the rotation signal, which provides information about the speed at which the magnetic tape 102 is being moved, into a voltage, which is fed into a differential amplifier 112. On the other hand, the counter 111 determines the number of revolutions completed by the counting roller 103 from the rotation signal, and feeds a signal, representing the cumulative number of revolutions completed from the time the winding-up of the magnetic tape 102 was begun, into a CPU 113. A ROM 114 stores information about a predetermined reference speed pattern, the reference tape movement length at each check point, the reference tension value and the like. Signals representing this information are converted into analog signals by D/A converters 115, 116 and 117, and the analog signals are fed into differential amplifiers 112, 118 and 119. Also, the differential amplifier 118 feeds a speed control signal into a servo amplifier 120, and the feed motor 108 is operated on the basis of the speed control signal. The differential amplifier 119 feeds a tension control signal into a servo amplifier 121, and the wind-up motor 109 is operated on the basis of the tension control signal.

Figure 5:
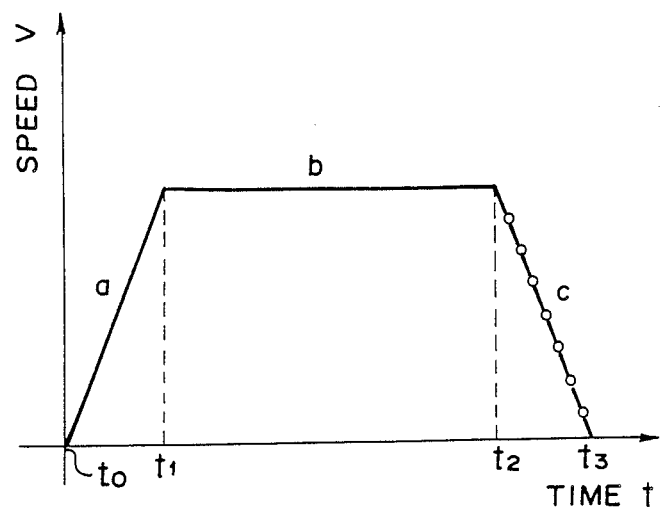
FIG. 5 is a graph showing an example of the reference speed pattern used in the embodiment of FIG. 4.

How the speed of the magnetic tape 102 is controlled will be described hereinbelow. By way of example, the reference speed pattern is designed as shown in FIG. 5 and comprises an acceleration zone (a), a constant speed zone (b) and a deceleration zone (c). The acceleration zone (a) lasts from time t0, at which the winding-up of the magnetic tape 102 is begun, to time t1, at which the magnetic tape 102 starts to move at a constant speed. The deceleration zone (c) lasts from time t2, at which the speed of the magnetic tape 102 begins to decelerate, to time t3, at which the winding-up of the magnetic tape 102 is finished. As indicated by the circles in FIG. 5, check points are selected at equal intervals in the deceleration zone (c). At each of the check points the signal, which is output by the counter 111 and represents the cumulative number of revolutions of the counting roller 103 from the start of the winding-up of the magnetic tape 102, is fed into the CPU 113. The CPU 113 compares the cumulative number of revolutions with the reference tape movement length at said check point (which length corresponds to the area under the reference speed pattern up to the projection of the check point on the t axis representing time). A speed correction value is calculated on the basis of the results of the comparison, and is fed into the differential amplifier 118 via the D/A converter 116. On the other hand, the signal representing the speed at which the magnetic tape 102 is being moved at the check points is fed from the counting roller 103 into the differential amplifier 112 via the F/V converter 110. Also, the signal representing the speed corresponding to the reference speed pattern is fed from the ROM 114 into the differential amplifier 112 via the CPU 113 and the D/A converter 115. The differential amplifier 112 compares the speed at which the magnetic tape 102 is moved with the speed indicated by the reference speed pattern, and feeds a signal representing the difference in speed into the differential amplifier 118. The differential amplifier 118 adds the difference in speed to the speed correction value received from the D/A converter 116, and generates a speed control signal. The feed motor 108 is accurately controlled on the basis of the speed control signal. This speed control process is carried out at each time corresponding to a check point in order to correct the tape movement speed, so that the actual tape movement speed becomes approximately zero at the time t3. The speed correction value at each check point is maintained by the CPU 113 or a latch (not shown) so that the speed correction value continues to be fed into the differential amplifier 118 until a new speed correction value is calculated at the time the next check point is reached. By way of example, five or six check points are set at intervals of 0.8 ms.

Figure 6:
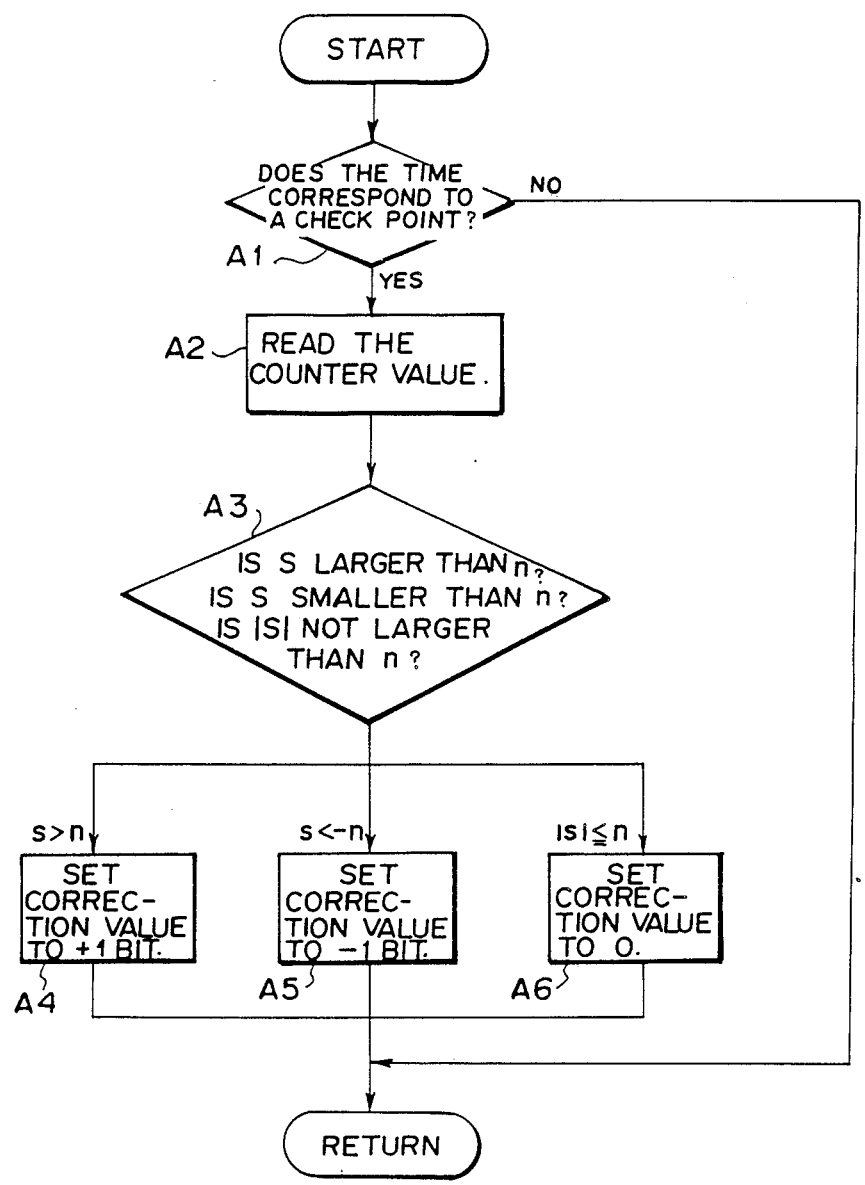
FIG. 6 is a flow chart of a correction value output program which is used in the embodiment of FIG. 4.

An output sub-routine program for the speed correction value will be described hereinbelow with reference to FIG. 6. The CPU 113 continuously reads time signals received from a timer, and judges whether or not the time corresponds to a check point (A1). When the time does not correspond to a check point, the operation of the CPU 113 returns to the ordinary routine. When the time corresponds to a check point, the CPU 113 reads the signal received from the counter 111, and calculates the cumulative tape movement length from the signal (A2). Thereafter, the CPU 113 calculates the difference between the cumulative tape movement length and the reference tape movement length corresponding to the check point, which length is stored in the ROM 114, and compares the difference with a predetermined value (A3). Specifically, the CPU 113 calculates S, which is expressed as (reference tape movement length)−(cumulative tape movement length), judges whether S is larger than a predetermined value n or is smaller than a predetermined value −n, or whether $|S|$ is smaller than the predetermined value n. If S is larger than the predetermined value n, the correction value bits are set to +1 (A4). When S is smaller than the predetermined value −n, the correction value bits are set to −1 (A5). When $|S|$ is smaller than the predetermined value n, the correction value bits are set to 0 (A6). After the correction value is determined in this manner, the operation of the CPU 113 returns to the ordinary routine.

The predetermined value n is set to, for example, the value of error between the cumulative tape movement length and the reference tape movement length. The term "bit" used for the correction value means the least significant bit (LSb) in the D/A converter 16.

Alternatively, the correction value may be set to integers not smaller than 2 bits or not larger than −2 bits, depending on the value S. In such cases, the cumulative tape movement length can closely approach the reference tape movement length.

The relationship between the value S and the speed correction value Δv is expressed by the linear formula $$\Delta v = -aS \text{ (a is a constant)} \quad (1)$$

The total correction value ΔV by which the speed is corrected in a correction period T is expressed by $$\Delta V = T \cdot \Delta v \quad (2)$$

In order to eliminate divergence when the speed is corrected, the condition expressed as $$-S < S + T \cdot \Delta v < S \quad (3)$$

should be satisfied.

Therefore, from Formulas (1), (2) and (3), the constant a should be set to a value falling within the range $$0 < a < \quad (4)$$

Figure 7:
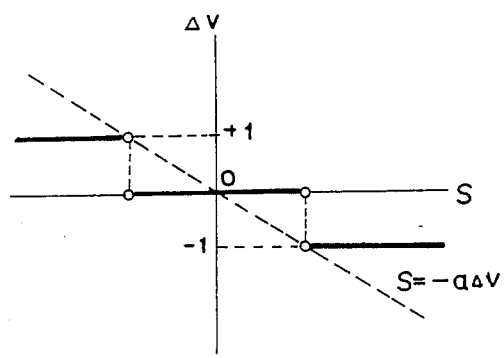
FIG. 7 is a graph showing the range in the correction values used in the embodiment of FIG. 4.

Formula (4) should be satisfied when the correction value is calculated linearly. However, the correction values are actually set digitally. Therefore, as shown in FIG. 7, the correction values are discrete values on the straight line having an inclination $-a$ which is determined by Formula (4).

The tape wind-up control method in accordance with the present invention is applicable also to a tape slitter or the like. Also, the tape is not limited to magnetic tape, and may be, for example, an abrasive tape, a paper tape, a plastic tape or the like.

In the embodiment of FIG. 4, speed control is carried out for the feed motor 108. However, the speed control may be carried out in the same manner for the wind-up motor 109.

Figure 9A:
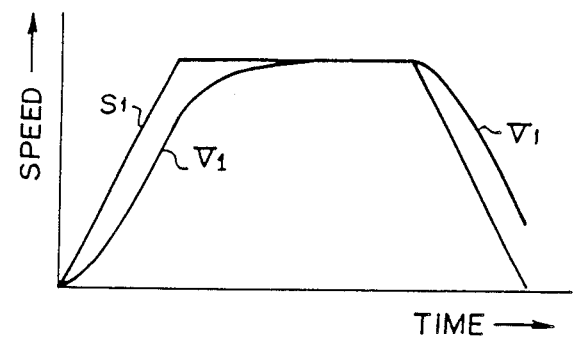
FIGS. 9A and 9B are graphs showing how the apparatus shown in FIG. 8 improves the closeness with which the tape movement speed follows a predetermined pattern.
Figure 9B:
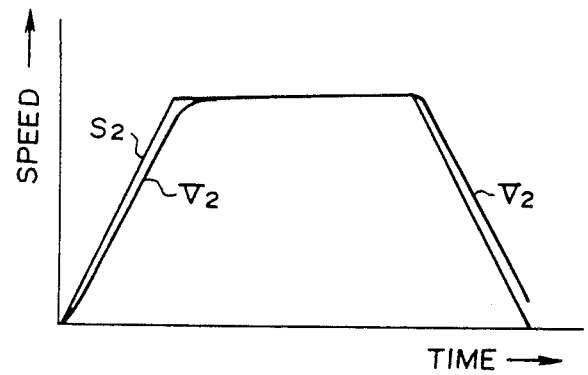
Figure 10:
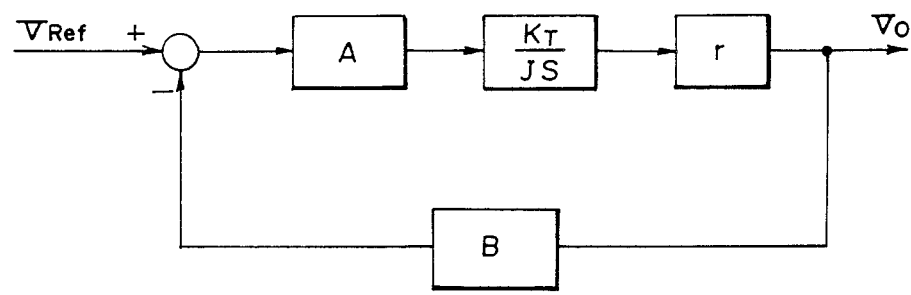
FIG. 10 is a block diagram for explaining a control loop in the embodiment shown in FIG. 8.

An embodiment of the tape wind-up apparatus in accordance with the present invention will be described hereinbelow with reference to FIGS. 8 through 10.

Figure 8:
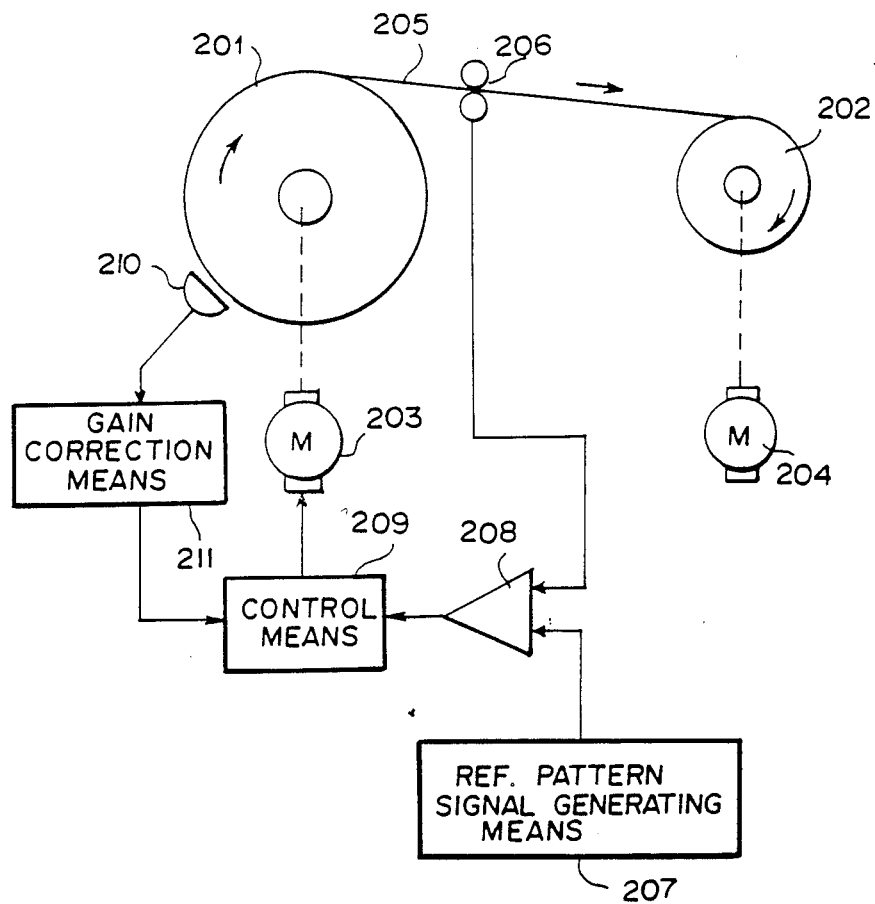
FIG. 8 is a schematic view showing a tape wind-up apparatus according to one embodiment of the present invention.

With reference to FIG. 8, an embodiment of the tape wind-up apparatus in accordance with the present invention comprises a feed reel 201, a wind-up reel 202, a drive motor 203 for driving and rotating the feed reel 201, a drive motor 204 for driving and rotating the windup reel 202, a tape speed detector 206 for detecting the movement speed of a tape 205 between the two reels 201 and 202, a reference pattern signal generating means 207 for outputting a predetermined tape speed pattern signal, a comparison means 208 for comparing a tape speed signal from the tape speed detector 206 with a tape speed pattern signal from the reference pattern signal generating means 207, a control means 209 for controlling the drive motor 203 on the basis of a comparison signal output from the comparison means 208 so that the movement speed of the tape 205 follows a predetermined speed pattern, a tape-diameter detection means 210 for detecting the diameter of the tape wound up about the feed reel 201, and a gain correction means 211 for arithmetically calculating a corrected gain value on the basis of tape diameter information supplied thereto by said tape-diameter detection means 210, which corrected gain value is fed to the control means 209 which controls said drive means 203.

The feed reel 201 comprises a tape obtained by winding an uncut or original tape, which has a length from several to several dozen times the length of the tape which is to be wound up around a single wind-up reel 202. Accordingly, when a predetermined amount of tape 205 has been wound up on a wind-up reel 202, this wind-up reel 202 is replaced by a new wind-up reel 202 around which tape is then wound up. The tape speed detector 206 may be a mechanical detection means, such as a counting roller (length-detection roller), or other electric or optical detection means as long as it can accurately detect the tape travel speed. The reference pattern signal generating means 207 comprises a predetermined memory element. The speed pattern stored in this memory element looks, for example, like the curves $S_1$ and $S_2$ shown in the graphs of FIGS. 9A and 9B. The comparison means 208 comprises a conventional differential amplifier or the like. The control means 209 comprises a current drive control circuit which receives a comparison signal from the comparison means 208 and feeds a motor drive current to the motor 203 which causes the motor 203 to drive the feed reel on the basis of the comparison signal. The control means 209 causes the tape movement speed to follow the speed pattern as described above.

The tape diameter detection means 210 accurately detects the diameter of the tape wound around the feed reel 201 and outputs a signal corresponding to the detected result. The tape diameter detection means 210 may comprise a linear encoder or the like, for example. A rotational detection means such as a rotary encoder is normally disposed on the drive motor 203. In the tape feed portion of the reel 201 is disposed a length-detection roller which comes into contact with the tape and rotates, thereby detecting the movement speed of the tape from the number of revolutions thereof. Then the diameter of the tape wound up on the supply reel 201 is calculated from a formula into which the output values from said detection means and said roller means are substituted. Accordingly, it is economical to constitute the tape diameter detection means 210 from the rotation detection means on the drive motor 203, the length detection roller and the arithmetical calculation means.

The gain correction means 211 delivers, to the control means 209, a correction signal for compensating for the variation in load inertia seen by the motor 203. The load inertia varies as the amount of tape wound up on the feed reel 201 varies, which amount can be determined on the basis of the tape diameter information from the tape diameter detection means 210, whereby even if the load inertia increases, the tape movement speed continues to follow the speed pattern. Calculation of a corrected gain value A in the gain correction means 211 is conducted as follows. Generally, the control loop for the drive motor 203 is represented as shown in FIG. 10, wherein A represents a gain, $K_T/Js$ a motor transmission function, B a speed/voltage converter, $K_T$ a torque constant, J the load inertia, r the diameter of the tape wound up on the Supply reel, $V_{Ref}$ the input voltage (current), and $V_o$ the tape speed. The following equation between the output $V_o(s)$ and input $V_{Ref}(s)$ is established:

$$V_o(s) = \frac{\frac{1}{B}}{\frac{J}{ABrK_T}S + 1} \cdot V_{Ref}(s) \quad (5)$$

Time constant T is given by:

$$T = \frac{J}{ABrK_T} \quad (6)$$

The time constant should be kept constant to make the tape movement speed follow the aforementioned speed pattern closely.

That is, instead of the diameter r being varied, the gain A is varied so that $$\frac{J}{ABrK_T} = \text{const.} \quad (7)$$

Since the inertia J also Varies as the diameter r varies on the feed reel side, the gain A is set as in the following equation:

$$A = C \cdot \frac{J(r)}{r} \quad (C: \text{constant}) \quad (8)$$

As described above, the tape wind-up apparatus winds a fixed length of tape delivered from the feed reel onto the wind-up reel, and several to dozens of wind-up reels are wound up with tape supplied from a single length of uncut tape. Therefore, as an example, the gain is varied for every rotation of a wind-up reel. In this case, the calculation of the corrected gain value is made as follows. First, the relationship between the radius r, inertia J(r) and function (n) is obtained.

As viewed from the top of the feed reel 201, the area occupied by the tape wound up on the (n)th wind-up reel is equal to the area occupied by the tape wound up on the (n+1)th wind-up reel, and therefore, the following equation is obtained:

$$r(n) = \sqrt{(n-1)k^2 - n + 2} \cdot r_l \quad (9)$$

where k is a constant, and $r_l$ is the radius of the outermost periphery.

Also, the following is given:

$$J(n) = \tfrac{1}{2} m (r_s^2 + r(n)^2) \quad (10)$$

Then, $$J(n) = \tfrac{1}{2}(N-n+1) \cdot m \cdot \{r_s^2 + r_l^2(k^2 n - k^2 - n + 2)\} \quad (11)$$

where N is the total number of turns, $r_s$ the (innermost peripheral) radius of chuck, and m the mass of the tape per wind-up reel.

If the equation J(n)/r(n)=X(n) is satisfied, A(n) is given by:

$$A(n) = C \cdot X(n) \quad (C \text{ is constant}) \quad (12)$$

The corrected gain A(n) is affected by the tension on the wind-up reel. The influence of the tension differs depending on the inertia J on the feed reel side (differs as the weight differs), and therefore, A(n) is given by:

$$A(n) = C \cdot W(n) \cdot X(n) \quad (13)$$

where W(n) is the weight.

The corrected gain A obtained as described above is sent to the control means 209, which corrects the value of the drive current for the motor 203.

Because the gain is corrected, the motor 203 is controlled more accurately, and when the diameter of the feed reel 201 is large, the closeness with which the tape travel speed follows the speed pattern is improved. The graph $V_1$ shown in FIG. 9(A) shows the variation in the tape movement speed when the corrected gain value is not fed to the control means 209. The graph $V_2$ shown in FIG. 9(B) shows the variation of the tape movement speed when the corrected gain value is fed to the control means 209.

While in the aforementioned embodiment, the corrected gain value is sequentially calculated as the tape travels, it is to be noted that a table of these corrected gain values is stored in the memory element in advance, and a predetermined corrected gain value may be sent to the control means 209 according to the diameter of the tape wound up around the feed reel.

While in the aforementioned embodiment, the corrected gain value is input into the control means 209, it is to be noted that the corrected value may be input into the drive motor 203 in the form of a motor drive correction current.

While in the aforementioned embodiment, a case has been described in which the diameter of the tape wound up around a feed reel is relatively large compared to that of the tape wound up around the wind-up reel, it is to be noted that the tape wind-up apparatus of the present invention may be applied to cases where the maximum diameters of the tape wound around both the reels are equal to each other (the case of a cassette tape).

What is claimed is:

1. A magnetic tape wind-up control method for use when a magnetic tape is wound around a wind-up reel in a magnetic tape wind-up apparatus, said apparatus comprising:
   (i) a feed reel which is rotated by a feed motor,
   (ii) the wind-up reel which is rotated by a wind-up motor,
   (iii) a movement detector which is located in the path along which the magnetic tape moves from the feed reel to the wind-up reel and which detects the feed speed of the magnetic tape and the length over which the magnetic tape has been fed,
   (iv) a dancing roller which is located between the movement detector and the wind-up reel in order to provide tension on the magnetic tape,
   (v) a position detector which detects the position of the dancing arm,
   (vi) a means for generating a tape speed command, and
   (vii) a means for generating a tape tension command, the speed at which the feed motor is rotated being controlled in accordance with a signal generated by the movement detector, and the speed at which the wind-up motor is rotated being controlled in accordance with a signal generated by the position detector, thereby to control the tension on the magnetic tape,
   wherein the improvement comprises the steps of:
   (a) detecting the number of revolutions of said wind-up motor,
   (b) calculating the outer diameter of a roll of said magnetic tape, which is being wound around said wind-up reel, from the thickness of said magnetic tape and the diameter of a core of said wind-up reel, which values have been stored in advance, and from the number of revolutions completed by said wind-up motor,
   (c) dividing the value of said tape speed command by the outer diameter of the roll of said magnetic tape,
   (d) generating a rotation speed command signal which represents the quotient of said division, and controlling the speed of rotation of said wind-up motor on the basis of the rotation speed command signal, and
   (e) simultaneously controlling the tension on said magnetic tape on the basis of the position of said dancing arm.

2. A magnetic tape wind-up control method as defined in claim 1 wherein said movement detector comprises a counting roller.

3. A tape wind-up control method in which, when a predetermined length of tape fed from a feed reel is wound around a wind-up reel, the speed at which the tape is moved is controlled on the basis of a predetermined reference speed pattern comprising an acceleration zone, which is of a predetermined duration and which starts when the winding-up of the magnetic tape is begun, and a deceleration zone which is of a predetermined duration and which terminates when the winding-up of the magnetic tape is finished, wherein the improvement comprises the steps of:
(i) selecting at least one check point in the deceleration zone of said reference speed pattern,
(ii) detecting the length, over which said tape has been moved after the winding-up of said tape was begun, at said check point,
(iii) comparing the detected length with a reference tape movement length which is based on said reference speed pattern, and
(iv) controlling the speed, at which said tape is moved, on the basis of the results of said comparison so that said predetermined length of tape has been wound around said wind-up reel at the end of said reference speed pattern.

4. A tape wind-up control method as defined in claim 3 wherein said tape is a magnetic tape.

5. A tape wind-up apparatus in which a feed reel and a wind-up reel are rotatively driven by individual drive means and in which a tape wound up on said feed reel is wound up onto the wind-up reel, the apparatus comprising:

speed detection means for detecting the tape movement speed between said two reels,
comparison means for comparing a speed signal, output from said speed detection means, with a predetermined speed pattern reference signal,
control means for driving and controlling the drive means on the feed reel side so that said tape movement speed follows a speed pattern on the basis of the result of the comparison made by said comparison means, tape-diameter detection means for detecting the diameter of the tape wound up on said feed reel and outputting tape-diameter information on the basis of the detected result, and
gain correction means for correcting a gain supplied to said control means, which drives and controls the drive means on the feed reel side on the basis of tape-diameter information output from said tape-diameter detection means.

6. The tape wind-up apparatus according to claim 5, wherein said tape movement speed detection means comprises a counting roller.

7. The tape wind-up apparatus according to claim 5, wherein said tape movement speed detection means comprises electric detection means.

8. The tape wind-up apparatus according to claim 5, wherein said tape movement speed detection means comprises optical detection means.

9. The tape wind-up apparatus according to claim 5, wherein said tape diameter detection means comprises a linear encoder.

10. The tape wind-up apparatus according to claim 5, wherein said tape diameter detection means comprises means for detecting the rotation of a drive motor for the feed reel, means which comes into contact with a tape, rotates and detects the movement speed of the tape, and calculation means for calculating and obtaining the diameter of the tape wound up on the feed reel on the basis of signals output from said rotation detection means and said tape movement speed detection means.

11. The tape wind-up apparatus according to claim 5, wherein said gain correction means varies a gain A so that said gain correction means satisfies:

$$\frac{J}{ABrK_T} = \text{const.}$$

wherein J: load inertia, B: ratio of speed/voltage, r: diameter of tape wound up on the feed reel, and $K_T$: torque constant.

* * * * *